United States Patent [19]

Mitsui

[11] 4,297,697
[45] Oct. 27, 1981

[54] POWER SUPPLY METHOD FOR LIQUID CRYSTAL DISPLAY

[75] Inventor: Yoshihiro Mitsui, Shiojiri, Japan

[73] Assignee: Kabushiki Kaisha Suwa Seikosha, Tokyo, Japan

[21] Appl. No.: 974,402

[22] Filed: Dec. 29, 1978

[30] Foreign Application Priority Data

Dec. 29, 1977 [JP] Japan ............................ 52/159275

[51] Int. Cl.³ .............................................. G08B 5/36
[52] U.S. Cl. .................................. 340/813; 323/312;
340/765; 350/332
[58] Field of Search ............. 350/331, 332; 323/22 T;
340/765, 813, 784

[56] References Cited

U.S. PATENT DOCUMENTS

| 3,613,351 | 10/1971 | Walton | 350/332 X |
|---|---|---|---|
| 3,919,625 | 11/1975 | Barton | 323/22 T |
| 3,921,162 | 11/1975 | Fukai et al. | 340/784 X |
| 3,956,661 | 5/1976 | Sakamoto et al. | 323/22 T |
| 4,037,931 | 7/1977 | Ido et al. | 340/784 X |
| 4,044,546 | 8/1977 | Koike | 350/332 X |
| 4,057,325 | 11/1977 | Kondo | 340/784 X |
| 4,091,377 | 5/1978 | Shimoi | 340/765 |
| 4,113,361 | 9/1978 | Nakano | 350/332 |
| 4,128,496 | 12/1978 | Cole et al. | 350/350 X |

*Primary Examiner*—David L. Trafton
*Attorney, Agent, or Firm*—Blum, Kaplan, Friedman, Silberman & Beran

[57] ABSTRACT

A power supply for a liquid crystal display including a power source for delivering a voltage larger than the driving voltage of the display and a voltage regulator for adjusting the voltage applied to the display to that required to drive the display is provided. The liquid crystal display includes at least two plates having electrodes thereon in a liquid crystal material disposed between the plates. The voltage regulator has a temperature characteristic corresponding to that of a liquid crystal display wherein the driving voltage of the display decreases with an increase in temperature. The power supply allows use of batteries having inferior discharge characteristics and operating the display in the ¼ duty-driving mode.

3 Claims, 11 Drawing Figures

POWER SUPPLY METHOD FOR LIQUID CRYSTAL DISPLAY

BACKGROUND OF THE INVENTION

This invention relates to a liquid crystal display, and more particularly to a power supply for a liquid crystal display including a power source for delivering a voltage larger than the driving voltage of the display and a voltage regulator for adjusting the voltage applied to the display to the driving voltage for driving the display.

Liquid crystal displays are widely used for the display in electronic calculators, electronic cash registers (ECR), electronic timepieces and measuring instruments since the power consumption is considerably less than that of other types of display elements. Moreover, numerals, marks and figures can be easily displayed with a liquid crystal display element.

In the case of a ten digit-display for an electronic calculator, the liquid crystal display (field-effect type) consumes about 10 $\mu$W (3 V). In contrast, a light emitting diode display consumes about 80 mW (3 to 5 V) and a fluorescent display tube consumes about 100 mW (24 V). Accordingly, the liquid crystal display is clearly superior in consumption of both power and voltage. Thus, the demand for liquid crystal displays is increasing when the liquid crystal display is utilized in combination with a C-MOS as a logic element for lower power consumption. Such electronic calculators are replacing electronic calculators employing conventional display elements for providing electronic calculators having extremely long battery life.

Notwithstanding the popularity of the liquid crystal display, there are difficulties in utilizing the liquid crystal display and many kinds of liquid crystal displays can not be used because of the following shortcomings. For example, the tolerance in the driving voltage for driving the display is narrow and more electrodes are required compared to other types of display elements since the liquid crystal display is not driven by a multiplex driving system, but is driven by the difference of the effective voltage between the lighting condition and the non-lighting condition. For example, when the driving voltage of a liquid crystal display is 3 V, the tolerance is ±5% or an absolute value of 0.15 V. The number of electrodes is 33 for driving a liquid crystal display in the ⅓ duty-driving method when the display includes 10 digits and each digit consists of 7 segments. In contrast, only 17 electrodes are required when a light emitting diode display is utilized. Accordingly, it would be desirable to provide a liquid crystal display which avoids the above noted inconveniences and additionally improves the usefulness of the liquid crystal display.

SUMMARY OF THE INVENTION

Generally speaking, in accordance with the invention, a power supply for a liquid crystal display is provided. The power supply includes a power source for delivering a voltage larger than the driving voltage required to drive the liquid crystal display and a voltage regulator coupled to the power source for adjusting the voltage applied to the liquid crystal display to that required to drive the display. In an exemplary embodiment the voltage regulator includes a temperature characteristic corresponding to the driving voltage of a liquid crystal display which decreases in response to an increase in temperature. In another embodiment of the invention, operation of a liquid crystal display is improved by decreasing the number of electrodes of the display as a result of utilizing a ⅓ duty-driving method. The power supply of the invention permits utilization of a power source of inferior discharge characteristics than batteries including silver.

Accordingly, it is an object of the invention to provide an improved liquid crystal display.

Another object of the invention is to provide an improved power supply including a voltage regulator for a liquid crystal display.

A further object of the invention is to provide a power supply which delivers a voltage for driving a liquid crystal display which is independent of the temperature characteristics and discharge characteristics of a power source.

Still another object of the invention is to provide an improved liquid crystal display driven in the ⅓ duty-driving mode.

Still another object of the invention is to provide a liquie crystal display of colors other than yellow.

Still a further object of the invention is to provide a liquid crystal display utilizing a lower number of electrodes as a result of utilizing the ⅓ duty-driving method.

Yet another object of the invention is to provide a power source for a liquid crystal display utilizing an alkali-manganese battery of inferior discharge characteristics.

Yet a further object of the invention is to provide a power supply for a liquid crystal display including a battery of inferior discharge characteristics and a temperature dependent voltage regulator for producing a driving voltage corresponding to the driving voltage of a liquid crystal display.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawing, in which.

DESCRIPTION OF THE PREFERRED EMBODIMENTS

Figure 1:
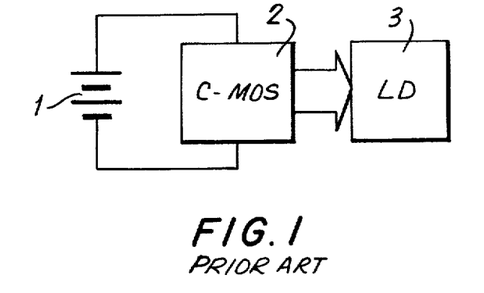
FIG. 1 is a block circuit diagram of a conventional electronic calculator.
Figure 2:
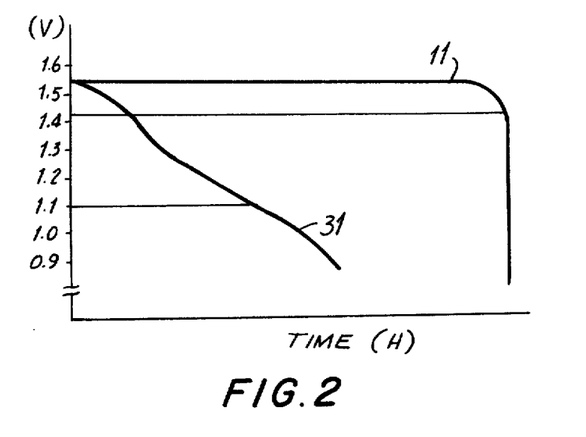
FIG. 2 is a graphical illustration of the discharge characteristics of a silver-oxide and alkali manganese battery.

In FIG. 1 a block circuit diagram of a conventional small-size electronic calculator is depicted. A power source 1 includes two silver oxide batteries for delivering power to a C-MOS LSI 2 and a liquid crystal display 3 of the calculator. The discharge characteristics of the silver oxide batteries conventionally used are extremely flat with respect to the low current load as illustrated by a curve 11 in FIG. 2.

Figure 3:
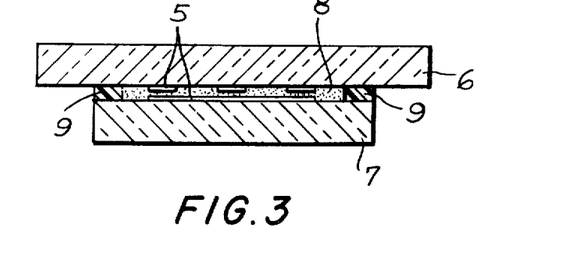
FIG. 3 is a cross-sectional view of a conventional liquid crystal display.

Referring now to FIG. 3, liquid crystal display 3 is shown in a cross-sectional view. A liquid crystal material 8 is disposed between an upper plate 6 and a lower plate 7, at least one of which is transparent and in an exemplary embodiment both are transparent and preferably both are glass plates. Electrode 5 are disposed on upper plate 6 and lower plate 7 and a spacer 9 is provided for retaining liquid crystal material 8 between the plates.

Figure 4:
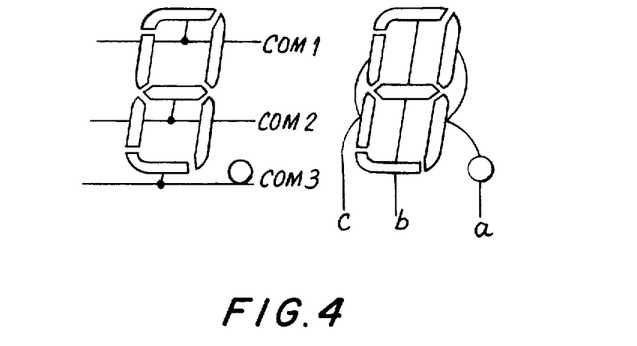
FIG. 4 is a connection diagram of a digit and a decimal point in the ⅓ duty-driving mode.

An example of a digit and a decimal point of the liquid crystal display and an electrical connection diagram thereof is shown in FIG. 4. The connection diagram illustrates the seven segment digit which is driven in the ⅓ duty-driving method. The segments of each digit are divided into three by three common lines illustrated as COM 1, COM 2 and COM 3 on one of plates 6 and 7. The segments of the digit on the opposing plate are divided into three driving groups, namely a, b and c, so that each of the three groups is not provided with two or more segments connected to any one of the above noted three common lines. Accordingly, when a liquid crystal display constructed in this manner includes ten digits of seven segments, the total number of required electrodes is 33. There are three common lines and ten driving lines a, b, and c, respectively.

Figure 5:
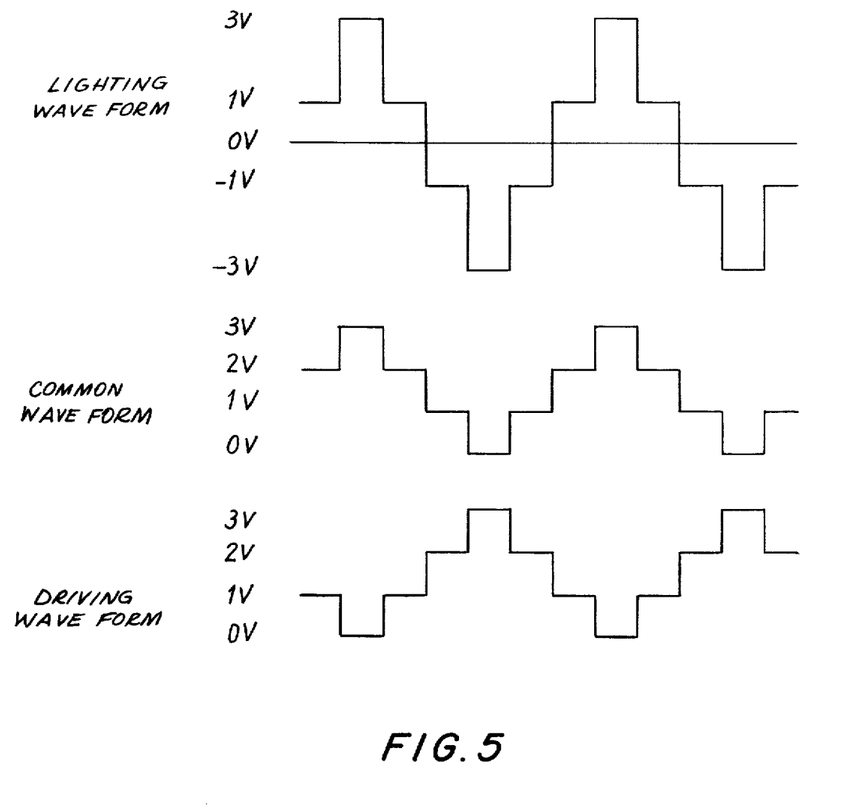
FIG. 5 illustrates voltage wave forms in the ⅓ duty-driving mode.

With respect to the ⅓ duty-driving mode there is shown in FIG. 5 a lighting wave form which is a compound wave form obtained by applying a common wave form to the common line of the segment desired to be lighted and a driving wave form to the driving line thereof. The liquid crystal display is lighted when the crest value of the lighting wave form is 3 V or −3 V and remains not lighted when the crest value thereof is 1 V or −1 V. As the common wave form and the driving wave form are applied to the segments which are not to be lighted so that the crest value of the compound wave form is 1 V or −1 V, the ratio U of the effective voltage value in the selected condition to the nonselected condition is represented by the following formula:

$$U = \sqrt{\tfrac{1}{3}(3V)^2 + \tfrac{2}{3}V^2}/V = 1.915.$$

Figure 6:
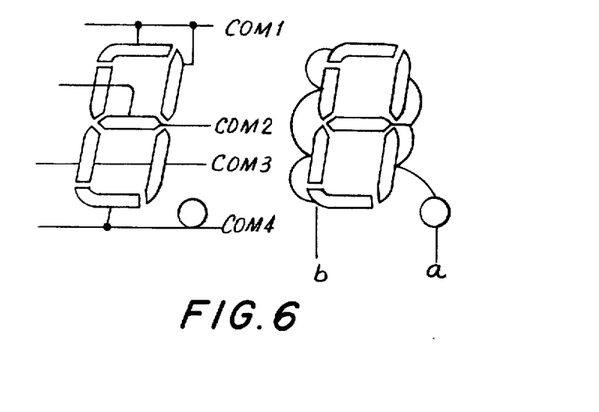
FIG. 6 is a connection diagram illustrating the ⅓ duty-driving mode arranged in accordance with the invention.
Figure 7:
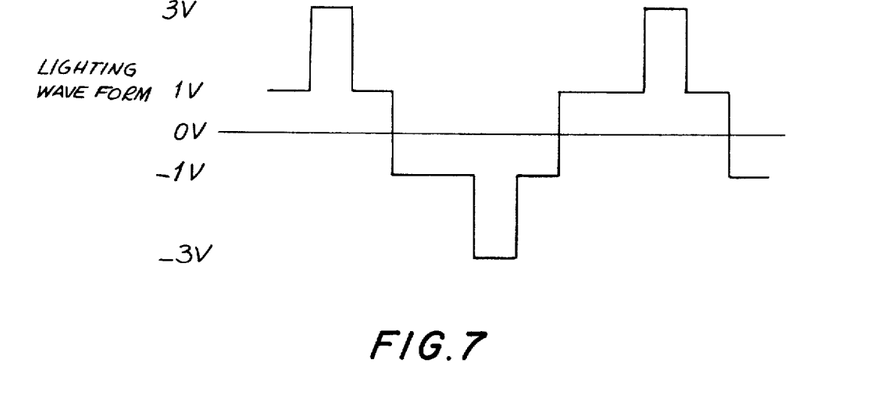
FIG. 7 is a lighting wave form of the digit illustrated in FIG. 6.

Referring now to FIG. 6, a connection diagram of a digit having seven segments and a decimal point in a ¼ duty-driving method constructed and arranged in accordance with the invention is shown. In FIG. 7, a lighting wave form for the display of the ¼ duty-driving method is shown. In the ¼ duty-driving method in accordance with FIG. 6, the number of electrodes is decreased by nine to 24 compared to the number of electrodes necessary in the ⅓ duty-driving method. The ratio of the effective voltage value U also decreases to 1.732 in the ¼ duty-driving method. Similarly, the tolerance of the driving voltage is reduced due to such a decrease in ratio of the effective value in the ¼ duty-driving method. The relationship between the duty method and the tolerance of the driving voltage of the liquid crystal display is shown in FIGS. 8 and 9.

Figure 8:
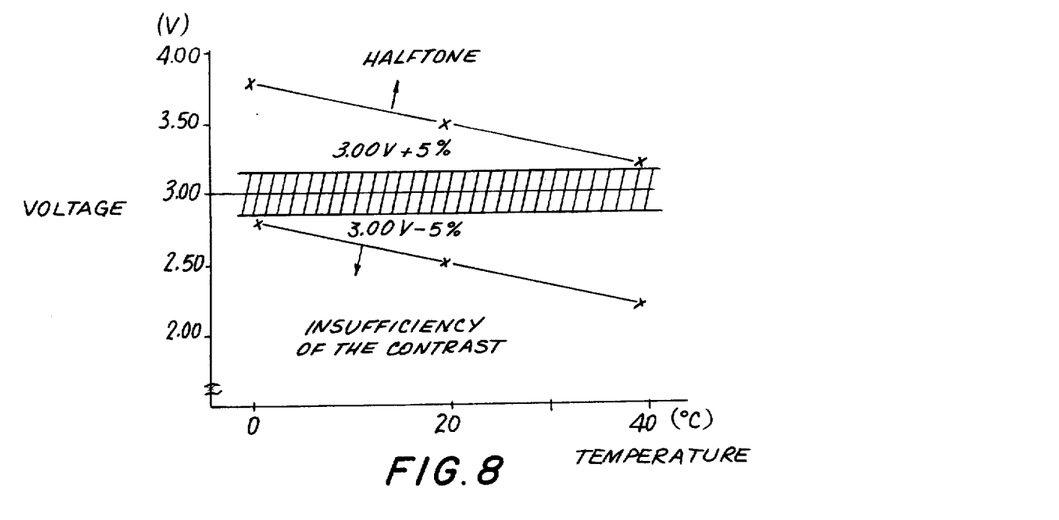
FIG. 8 is a graphical illustration of the temperature dependency characteristics of the driving voltage when a liquid crystal display is driven in the ⅓ duty-driving method as illustrated in FIG. 4.

In FIG. 8, the temperature dependency characteristics of the driving voltage for driving the liquid crystal display when the display is driven in ⅓ duty is illustrated. For a liquid crystal of a TN mode (Twisted Nematic Mode) the driving voltage generally changes at the rate of about −8 to −14 mV/°C. Therefore, the higher the temperature becomes, the lower the driving voltage for driving the display. The upper solid line of the graph illustrates that the halftone, namely the phenomenon that a non-selected segment can be seen, occurs in the higher range of voltage than the voltage shown within the solid lines. The lower solid line illustrates that insufficiency of contrast, namely the phenomenon that the selected segments can not be seen fully, occurs in the lower range of voltages than the voltage shown by the solid line. Accordingly, the voltage applied to the liquid crystal display for driving the display should be in the range between the upper and the lower solid lines if suitable contrast in the display is desired. Thus, the range of driving voltage for driving the display of 3.000 V±5% is suitable, as illustrated in the shaded region in FIG. 8, if the operable temperature range of the liquid crystal display is between about 0° C. to 40° C.

Referring again to FIG. 2, the time-discharge characteristic of a silver oxide battery illustrated by line 11 shows that up to about 1.425 V per battery can be obtained. As can be seen from FIG. 8, a decrease in the effectiveness of the liquid crystal display is expected in response to changes in the driving voltage. These changes may be due to any type of manufacturing variation of the liquid crystal display, a variation of the liquid crystal material itself, and the like. Furthermore, as the internal resistance of a silver oxide battery at low temperatures is three times as great as the internal resistance at 20° C., the battery voltage (the driving voltage) has a temperature characteristic opposite to that of the liquid crystal display.

Figure 9:
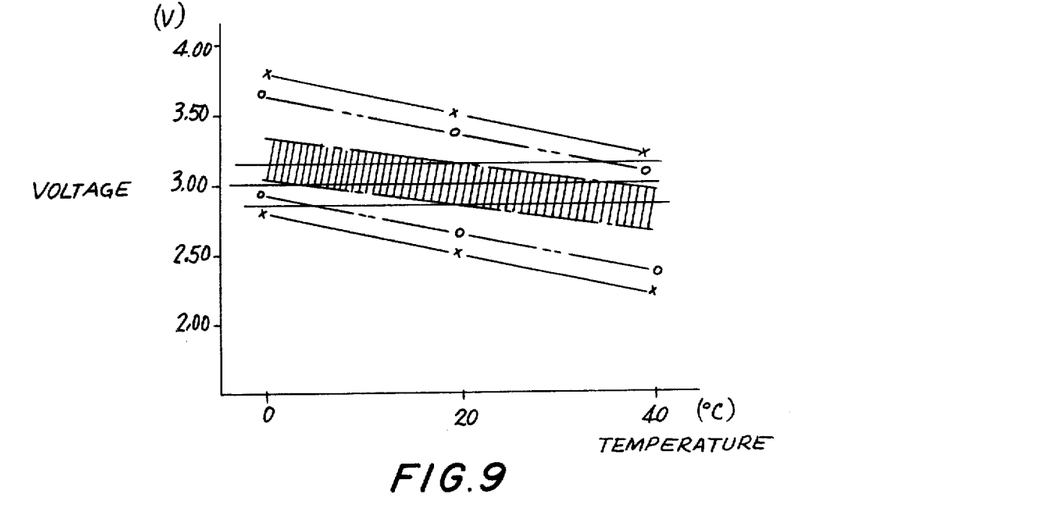
FIG. 9 is a graphical illustration of the temperature dependency characteristics of the driving voltage for a liquid crystal display driven in ⅓ duty-driving mode and in ¼ duty-driving mode when driven by a temperature dependent voltage regulator in accordance with the invention.

Referring now to FIG. 9, the temperature dependency characteristics of the driving voltage for driving a liquid crystal display in the ¼ duty-driving method in accordance with the invention is shown by the two-dots-dash lines. The temperature dependency characteristic for the display in the ⅓ duty-driving method is also shown by the range between the solid lines as shown in the representation in FIG. 8. The voltage tolerance in the case of driving the liquid crystal display in the ¼ duty-driving mode has been determined to be ±2% experimentally. Thus, FIG. 9 shows that sufficient contrast can not be obtained when the driving voltage is maintained in the range of ±5% for temperatures between 0° C. and 40° C. The temperature dependency characteristics for a white liquid crystal driven in the ¼ duty-driving method are the same as a yellow liquid crystal display driven in the ¼ duty-driving method.

By utilizing conventional liquid crystal display devices it is not possible to use a yellow liquid crystal display driven in the ¼ duty-driving method or a white liquid crystal display driven in the ⅓ duty-driving method by improving the liquid crystal in the TN mode which is generally used. Thus, it is one of the principal objects of the invention to deliver a driving voltage to the display which has a temperature characteristic as shown on the shaded region within the one-dot-dash lines in FIG. 9 by including a voltage regulator in the display device.

Figure 10:
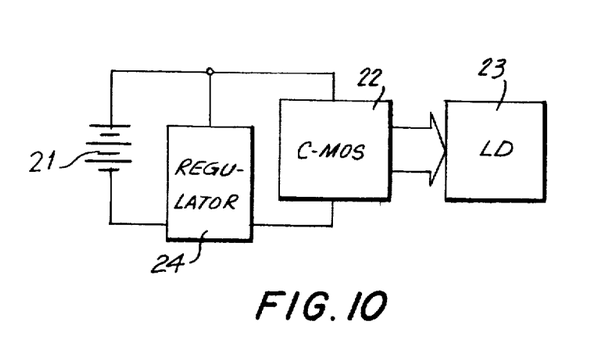
FIG. 10 is a block circuit diagram of a miniaturized electronic device including a power supply constructed and arranged in accordance with the invention.

Referring now to FIG. 10, a block circuit diagram of a small-sized electronic device, such as a calculator including a voltage regulator 24 in accordance with the invention is shown. A power source 21 includes three alkali-manganese batteries and a C-MOS 22 is the logic element and a liquid crystal display 23 is provided. The time-discharge characteristics of an alkali-manganese battery is shown by line 31 in FIG. 2 to be inferior to the discharge characteristic of a silver oxide battery as shown by line 11. If three alkali-manganese batteries are utilized, each having a voltage more than 1.1 V, more than 3.3 V can be obtained from power source 21.

Figure 11:
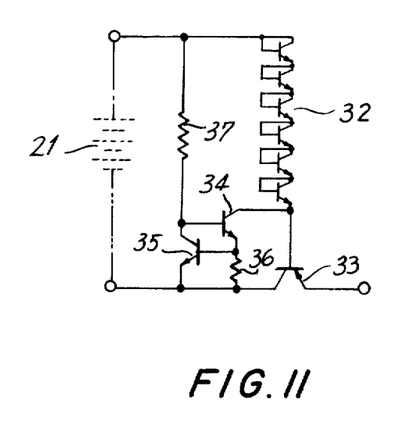
FIG. 11 is a circuit diagram of a circuit for the voltage regulator of FIG. 10 constructed and arranged in accordance with one embodiment of the invention.

In accordance with the invention, the output of voltage regulator 24, namely the driving voltage for driving liquid crystal display 23, is preferably within the range of 3 V±5%, without reference to the change of the output voltage of the batteries and power source 21. In this connection, an exemplary embodiment of a voltage regulator constructed and arranged in accordance with the invention is shown in FIG. 11. The regulator circuit includes a plurality of transistors 32 connected in series. The characteristics of each diode between the base and the emitter provides a forward voltage of 600 mV to 700 mV depending on the forward current. A series of five transistors 32 are required to obtain the necessary output voltage of 3 V. The forward current required to obtain the driving voltage of 3 V can be obtained by a constant-current circuit, including a transistor 34 and a transistor 35 and two resistances 36 and 37, independent of the input voltage to regulator 24 which represents the output of power source 21. One additional transistor 32 is included in the series in order to compensate for the voltage between the base and emitter of a transistor 33 connected to power source 21 in series.

The desired temperature dependency characteristic of −10 mV/°C. for the regulator circuit can be obtained by taking advantage of the fact that the temperature dependency characteristic of the base to emitter voltage of each transistor 32 is −2 mV/°C., and by summing up the temperature characteristics of five of transistors 32. This overall temperature dependency characteristic corresponds to the temperature dependency characteristic of the liquid crystal display as represented by the driving voltage necessary for driving the liquid crystal display as shown by the range between the two-dot-dash lines of FIG. 9. Thus, a driving voltage within the tolerance range of the display is obtained in the case where the liquid crystal is driven in ⅓ duty-driving method. In accordance with the embodiment of the invention, the liquid crystal display of an electronic device may also be used without changing the display where the liquid cyrstal is driven in the ¼ duty-driving method or a white liquid crystal display is driven in the ⅓ duty-driving method.

In addition, the invention contemplates the use of low-priced alkali-manganese batteries for driving the liquid crystal display. Such a device, including a display driven in the ¼ duty-driving method provides an improved display and becomes less expensive. The number of electrodes required for operating the liquid crystal display is decreased and the number of terminals of the C-MOS for driving the liquid crystal display can be decreased by constructing and arranging the display in the ¼ duty-driving method in accordance with the invention. In these cases the reliability of the liquid crystal display is increased and the liquid crystal display becomes less expensive to assemble since the number of connections also decreases. This decrease in the number of terminals of the C-MOS necessary to drive the display makes it possible to drive another function, for example some additional symbol added to the liquid crystal display. Additionally, it is possible to connect a printer to the electronic calculator whereby both display and printing functions are possible by utilizing a single chip C-MOS LSI.

As mentioned above, with respect to utilizing the power source for a liquid crystal display in a small sized electronic calculator, an electronic device utilizing the power source in accordance with the invention easily achieves the aforementioned objects. Accordingly, it is possible to utilize a power source having generally acknowledged inferior time-discharge characteristic than batteries including silver as a power source for providing a driving voltage for driving a liquid crystal display when the power supply includes a voltage regulator. A voltage regulator having a temperature dependency characteristic corresponding to that of the liquid crystal display so that the power source delivers a voltage that decreases in accordance with increase in temperature makes it possible to operate a liquid crystal display in the ¼ duty-driving method in accordance with the invention and a white liquid crystal display in the ⅓ duty-driving method. Such displays constructed and arranged in accordance with the invention provides an improved display which is less expensive to assemble and frees terminals of the C-MOS to perform additional functions.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A power supply for a liquid crystal display, comprising:
    DC power source means for delivering a source voltage larger than the driving voltage for driving said display, said power source means having first and second reference terminals;
    voltage regulator means coupled to said power source means for receiving said source voltage and in response thereto supplying a regulated output voltage having a negative temperature characteristic, said regulated output voltage corresponding to the driving voltage of said display, said voltage regulator means including first and second output terminals for outputting said regulated voltage, logic circuit means coupled intermediate said first and second output terminals and said liquid crystal display for receiving said regulated output voltage and in response thereto selectively driving said liquid crystal display;

a transistor coupled in series between said second reference terminal and said second output terminal;

said voltage regulator means including constant-current circuit means coupled intermediate said first reference terminal and said transistor, and a plurality of series-connected forward biased diode means coupled between said first reference terminal and said transistor, each of said diode means having the same forward voltage and negative temperature characteristic, said constant-current circuit supplying said forward current to said plurality of series-connected diode means, said regulated output voltage being substantially determined by multiplying the forward voltage of one of said diode means by the number of said diode means, said negative temperature characteristic of said regulated output voltage being substantially determined by multiplying the negative temperature characteristic of said forward voltage of one of said diode means by the number of diode means.

2. The power supply as claimed in claim 1, wherein said constant-current circuit means supplies a constant current to said plurality of series-connected diode means independent of the variation of the source voltage supplied by said DC power source means, there being five series-connected forward biased diode means in said voltage regulator means, each said diode means having a forward voltage of about 600 mV whereby said output voltage is about 3 V.

3. The power supply as claimed in claim 1, wherein each said diode means has a negative temperature characteristic of the forward voltage of $-2$ mV/°C. whereby the temperature characteristic of said output voltage is $-10$ mV/°C.

* * * * *